United States Patent
Laranov et al.

[11] 3,886,446
[45] May 27, 1975

[54] DIGITAL INDICATOR OF THE ELECTROMOTIVE FORCE OF A HALL-EFFECT DEVICE WHICH ELIMINATES THE INFLUENCE OF THE NON EQUIPOTENTIAL VOLTAGE

[76] Inventors: Sergei Glebovich Laranov, Brest-Litovsky prospekt, 2, kv. 107; Voldmir Vasilievich Braiko, ulitsa Vernadskogo, 75, kg. 18a; Jury Trofimovich Chigirin, prospekt 40 let Oktyabrya, 100-2, kv. 149; Vladimir Petrovich Belousov, ulitsa Vernadskogo, 61, kv. 3/1, all of Kiev, U.S.S.R.

[22] Filed: Oct. 16, 1972

[21] Appl. No.: 297,905

[52] U.S. Cl............................... 324/45; 323/94 H
[51] Int. Cl............................................. G01r 33/06
[58] Field of Search................. 324/45, 117 H, 120; 307/309; 323/94 H

[56] References Cited
UNITED STATES PATENTS

| | | | |
|---|---|---|---|
| 3,064,193 | 11/1962 | Grubb et al........................ | 324/120 |
| 3,416,010 | 12/1968 | Kuhnlein et al..................... | 324/45 |

OTHER PUBLICATIONS

Shirer, D., Pulsing Hall Probes For Greater Output; Rev. of Scien. Inst.; Vol 31; No. 9; Sept. 1960; pp. 1000–1001.

*Primary Examiner*—Robert J. Corcoran

[57] ABSTRACT

A digital indicating instrument for the electromotive force of a Hall-effect device, wherein pairs of opposed electrodes are alternatingly connected by means of a selector switch to a voltage supply source and to a "voltage-code" converter, whereas a circuit determining the moment of completion of a coding cycle, associated with the voltage-code converter and with the selector switch, controls the mode of the operation thereof and provides for measurement of the electromotive force of the Hall device for at least two coding cycles. The disclosed digital indicating instrument completely eliminates the influence of the non-equipotentiality voltage upon the results of the measurement of the electromotive force of the Hall device; it provides for indication of the true value of the electromotive force by a completely automatic measurement and indication process.

2 Claims, 2 Drawing Figures

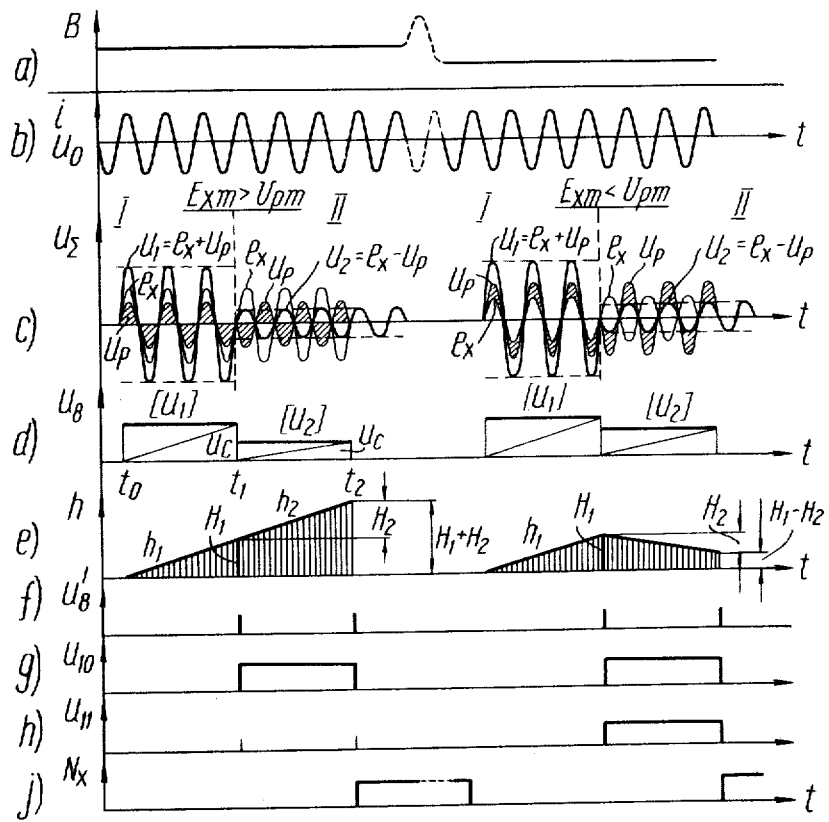
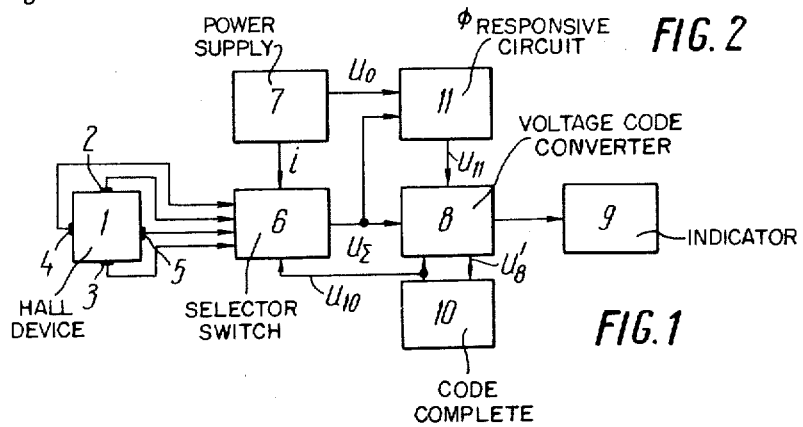
FIG. 2
FIG. 1

DIGITAL INDICATOR OF THE ELECTROMOTIVE FORCE OF A HALL-EFFECT DEVICE WHICH ELIMINATES THE INFLUENCE OF THE NON EQUIPOTENTIAL VOLTAGE

The invention relates to indicators of the electromotive force of a Hall-effect device, and, more particularly, it relates to digital indicators of the electromotive force of a Hall-effect device; it can be employed in various devices utilizing the Hall effect.

There is known a digital indicator of the electromotive force of a Hall-effect transducer comprising a Hall electromotive force transducer having one pair of the opposed electrodes thereof connected to a voltage supply source and the other pair of the opposed electrodes thereof connected to a voltage-code converter associated with a numerical indicator. The output voltage of the transducer, which is developed across the said other pair of the opposed electrodes, is coded by the voltage-code converter and displayed by the numerical indicator.

There are also known analogue devices for measurement of the electromotive force of a Hall-effect device, wherein there is eliminated the influence of the non-equipotentiality voltage upon the electromotive force of the Hall-effect device. These devices comprise a Hall-effect device with two pairs of opposed electrodes, one pair being connected through a selector switch to a voltage supply source and the other pair being connected through the selector switch to the indicator of the electromotive force of the Hall-effect transducer. The selector switch is meant for establishing alternating connection of the two pairs of the electrodes of the Hall-effect transducer, respectively, to the voltage supply source and to the indicator of the electromotive force. When one pair of the opposed electrodes is thus connected to the voltage supply source, the other pair is connected to the indicating instrument, and, vice versa, when the other pair is connected to the voltage supply source, the first pair is connected to the indicating instrument.

The transducer being irreversible, as far as the Hall electromotive force is concerned, and reversible in respect of the non-equipotentiality voltage, the output voltage of the transducer, developed alternatingly across the two pairs of the opposed electrodes, is bound to represent during an odd cycle of the operation of the selector switch a sum total of the Hall electromotive force and the non-equipotentiality voltage, and during an even cycle of the operation of the switch — the difference therebetween.

The angular displacement of the pointer of the indicator of the electromotive force of a Hall-effect device is proportional to the mean value of the absolute levels of the output signals developed across each pair of the opposed electrodes, i.e. to the value of the electromotive force of the Hall-effect device, and, consequently, does not depend on the non-equipotentiality voltage.

Thus, the abovedescribed device is operated on the principle of repeated alternating connection of the two pairs of the electrodes and includes an indicating instrument of the mean values of the absolute levels of the output signals of the Hall-effect device with a relatively great time constant.

However, the known digital indicator of the electromotive force of a Hall-effect device is not free from a series of disadvantages.

First, the accuracy of their measurement of the weak signals coming from the Hall-effect device is relatively low, on account of the influence of the non-equipotentiality voltage of the transducer, which, although compensated for or corrected, is nevertheless unstable in relation to time and influenced by ambient temperature.

Second, the known indicators are virtually incapable of measuring the true value of the Hall electromotive force in cases when the non-equipotentiality voltage is not easily separated from the electromotive force of the transducers, i.e when the appearance of the two said signals is similar.

Third, the measurement time is relatively great, on account of the necessity of manually resetting the instrument to zero prior to any measurement being taken. This fact either complicates, or even completely prohibits the employment of the known indicator for measurement of the electromotive force of the Hall-effect transducer, of which the duration is shorter than the necessary time of resetting to zero.

Besides, the known indicator makes the problem of introducing complete automation into the measurement and indication of the electromotive force of a Hall-effect device a complicated one.

On the other hand, the abovedescribed known analogue device for indication of the electromotive force of a Hall-effect device is not free from disadvantages.

First, the accuracy of the measurement of the Hall electromotive force is inadequately high, on account of the influence of switching interference.

Second, the swiftness of action of the instrument is insufficient, because the output voltage of the transducer has to be subjected to thorough filtration.

Third, the apparatus is not adequately reliable, on account of repeated switching cycles of the selector switch.

However, it is impossible to use directly the abovedescribed Hall-effect device in which the electrodes are switched over in the abovedescribed manner in the known digital indicator of the electromotive force of a Hall-effect device, because during each successive cycle of the operation of the voltage-code converter of the numerical indicator, the information representing the value of the output voltage during the preceding cycle is lost.

The present invention aims at providing a digital indicator of the electromotive force of a Hall-effect device, which should not necessitate resetting the instrument to zero before taking a measurement.

This aim is achieved in a digital indicating instrument of the electromotive force of a Hall-effect device, wherein pairs of the opposed electrodes are alternatingly connected by means of a selector switch to a voltage supply source and to a voltage-code converter associated with a numerical indicator device, in which instrument, in accordance with the present invention, there is provided a circuit to determine the moment of completion of a coding cycle, the input of said circuit being connected to said voltage-code converter, the output of said circuit being connected to said selector switch and also to said converter.

It is advisable that a digital indicating instrument of the electromotive force of a Hall-effect device, constructed in accordance with the invention, should further include a phase-responsive member adapted to develop a control signal to act upon said voltage-code converter, upon the value of the voltage of the non-equipotentiality of said Hall-effect device rising above the value of the electromotive force thereof, one input of said phase-responsive member being connected to the output of said selector switch, the other input of said phase-responsive member being connected to said voltage supply source, the output of said phase-responsive member being connected to said voltage-code converter.

The herein disclosed digital indicating instrument of the electromotive force of a Hall device, constructed in accordance with the invention, completely eliminates the influence of the non-equipotentiality voltage upon the value of the electromotive force, which is being indicated, whereby the accuracy, the response and the swiftness of action of the instrument are stepped up.

The present invention will be better understood from the following detailed description of an embodiment thereof with reference to the accompanying drawings, wherein:

FIG. 1 is a block diagram of a digital indicating instrument of the electromotive force of a Hall-effect device, constructed in accordance with the invention;

FIG. 2a is a diagram showing the variation of the permanent magnetic induction acting upon the Hall EMF device, related to time, according to the invention;

FIG. 2b is a diagram of the variation of the supply current of the Hall EMF device and of the reference voltage, related to time, according to the invention;

FIG. 2c is a diagram of the variation of the total output voltage of the Hall EMF device, related to time, according to the invention;

FIG. 2d illustrates the comparison between the diagrams of the absolute values of the output voltage of the Hall EMF device, related to time, and the linearly varying compensation voltage, according to the invention;

FIG. 2e is the time-related diagram of the variation of the code of the voltage-code converter in the process of coding of the output voltage of the Hall EMF device, according to the invention;

FIG. 2f is the time-related diagram of the variation of the pulse signal at the output of the voltage-code converter, according to the invention;

FIG. 2g is the time-related diagram of the variation of the output voltage of a coding completion moment determination circuit, according to the invention;

FIG. 2h is the time-related diagram of the variation of the output voltage of a phase-responsive member, according to the invention;

FIG. 2j is the time-related diagram of the variation of tthe indication of the digital indicating instrument, according to the invention.

Referring now to the appended drawings, the herein disclosed digital indicating instrument of the electromotive force of a Hall device comprises: a Hall device FIG. 1 having two pairs of opposed electrodes 2, 3 and 4, 5, respectively, connected via a selector switch 6 with a power supply source 7 and a voltage-code converter 8 associated with a digital, or numerical indicator 9. The herein disclosed apparatus further comprises a circuit 10 to determine the moment of completion of the coding operation, the input of the circuit 10 being connected to the converter 8 and the output thereof being connected with the selector switch 6 and with the converter 8.

The selector switch 6 is intended for alternating the switching over of the two pairs of the electrodes, i.e. first, one pair of the electrodes of the Hall device 1, e.g. the electrodes 2 and 3, is connected to the supply source 7, while the other pair, i.e. the electrodes 4 and 5, is connected to the voltage-code converter 8, and then the connection pattern is reversed.

The voltage-code converter 8 may be of either a time-pulse structure, or a frequency-pulse structure, or else a code-pulse structure.

The circuit 10 to determine the moment of the completion of a coding operation is intended for determining the moment when the converter 8 completes the operation of coding of the output voltage of the Hall device 1, and then for shaping a control signal to act upon the selector switch 6 and converter 8. The said block 10 provides for measurement of the electromotive force of the Hall device 1 for at least two cycles.

The herein disclosed digital indicating instrument may also include a phase-responsive member 11 of which one input is connected to the output of the selector switch 6 and the other input is connected to the supply source 7, the output of the phase-responsive member 11 being connected to the voltage-code converter 8.

The herein disclosed apparatus operates as follows.

Prior to commencement of the measurement of the electromotive force of the Hall device, there is performed initial setting of the selector switch 6 (FIG. 1), of the voltage-code converter 8 and of the circuit 10 determining the moment of completion of a coding operation.

When the Hall device 1 (FIG. 1) is acted upon, for instance, by permanent magnetic induction $b$ (FIG. 2a) and when it is supplied, e.g. with sinusoidal alternating current $i$ (FIG. 2b) through the pair 2, 3 of electrodes (FIG. 1) which are connected, when the selector switch 6 is in its initial state, to the voltage supply source 7, there appears a voltage $u_1$ (FIG. 2c) across the other pair 4, 5 of electrodes (FIG. 1), the voltage $u_1$ being made up by Hall electromotive force $e_x$ and non-equipotentiality voltage $u_p$.

The non-equipotentiality voltage $u_p$ results from the current $i$ flowing through the electrodes 2, 3 (FIG. 1) of the Hall-effect device and is brought about by the previously mentioned electrodes 4, 5 being connected to non-equipotential points of the plate of the Hall device 1. The value of the non-equipotentiality voltage $u_p$ depends on the specific resistance of the material of the Hall device and is proportional to the value of the supply current.

Let it be assumed that the Hall electromotive force $e_x$ and the non-equipotentiality voltage $u_p$ are co-phasal (FIG. 2c), i.e. the instantaneous value of the output voltage $u_1$ developed across the electrodes 4, 5 (FIG. 1) of the Hall device is equal to $$U_1 = (E_{xm} + U_{pm})\sin \omega_o t,$$

where
  $E_{xm}$ and $U_{pm}$ are, respectively, the maximal values of the Hall electromotive force and of the non-equipotentiality voltage;
  $\omega_o$ is the cyclic frequency of the supply current $i$.

At the initial moment $t_o$ (FIG. 2d) of a measurement, the voltage-code converter 8 (FIG. 1), which is, e.g. of a time-pulse structure, and is connected through the selector switch 6 with the electrodes 4 and 5, effects coding of the absolute value $|u_1|$ (FIG. 2d) of the output voltage of the Hall device 1 (FIG. 1), by comparing it, for instance, with a linearly varying reference voltage $u_o$ (FIG. 2d). The result of the coding operation, i.e. the value $h_1$ (FIG. 2e) is stored as a digital static code $H_1$ in the memory of the voltage-code transducer 8 (FIG. 1).

If the converter 8 is of a code-pulse structure, it is essential that the structure of the herein disclosed digital indicating instrument of the electromotive force of a Hall-effect device should include, in addition to the reversible counter already incorporated in converters of this kind intermediate the voltage-code converter 8 and the digital indicator 9, an auxiliary reversible counter (not shown in the drawing) also connected intermediate the converter 8 and the indicator 9, the auxiliary counter being meant to store the result of the coding of the output voltage $u_1$ of the Hall device.

The moment $t_1$ (FIG. 2d) of the completion of the operation of coding of the absolute value $u_1$ of the output voltage of the Hall device 1 (FIG. 1), which is the moment of the completion of the first measurement cycle 1 (FIG. 2d), is determined by the circuit 10 (FIG. 1), a pulse signal $U_8$ (FIG. 2f) being sent at this moment to the input of the circuit 10 from the converter 8 (FIG. 1). The circuit 10 determining the moment of the completion of the coding operation generates a control signal $u_{10}$ (FIG. 2g) acting upon the voltage-code converter 8 (FIG. 1) and upon the selector switch 6.

Upon having received this control signal, the voltage-code converter is prepared for coding the successive value of the output voltage of the Hall device 1, without the final outcome $H_1$ (FIG. 2e) of the coding of the first cycle 1 being zeroed. The switch 6 (FIG. 1) is operated by the control signal to connect the electrodes 4 and 5 of the Hall device 1 to the supply source 7, and at the same time to connect the electrodes 2 and 3 to the voltage-code converter 8. In this way the second cycle 11 (FIG. 2d) of the measurement of the output voltage of the Hall device 1 (FIG. 1) by the herein disclosed apparatus is started.

As a result of the irreversibility of the Hall device 1 in respect of the Hall electromotive force $E_x$ and of the reversibility of the same device in respect of the non-equipotentiality voltage $U_p$, during the second measurement cycle 11 the instantaneous value $U_2$ (FIG. 2c) of the Hall device 1 (FIG. 1), developed across the electrodes 2 and 3 (taking in account the invertion of the voltage, ensured by corresponding connection of the contacts of the selector switch 6) equals to $$U_2 = (E_{xm} - U_{pm})\sin \omega_o t.$$

The inherent irreversibility of the Hall-effect device 1 thus results in the phase shift angle between the Hall electromotive force and the non-equipotentiality voltage being varied, upon the change-over of the pairs of the opposite electrodes 2, 3 and 4, 5, through 180°.

It is known from both theoretical and experimental research that in the case of an isotropic Hall device 1 the values $E_{xm}$ and $U_{pm}$ during both abovedescribed cycles are bound to be precisely the same, the phase shift angle therebetween being either 0° or 180° (see, for example, a study by R. F. Wick "Solution of the problem of a Hall electric field in a germanium girator", Journal of Applied Physics, Vol. 25, No. 6, 1954).

During the second measurement cycle II the voltage-code converter 8, of which the input is connected through the selector switch 6 to the electrodes 2 and 3, is coding the absolute value $|u_2|$ (FIG. 2d) of the output voltage of the Hall device 1 (FIG. 1) and sums up the current code $h_2$ (FIG. 2e) with the stored code $H_1$. The moment $t_2$ (FIG. 2d) of the completion of the coding of the output voltage $U_2$ (FIG. 2c) of the Hall device 1 (FIG. 1) is monitored by the circuit 10 which sends a control signal to discontinue the measurement (the connection through which the last-mentioned control signal acts upon the voltage-code converter 8 is omitted in FIG. 1 for the sake of better clarity).

Thus, during two successive cycles the herein disclosed apparatus performs a complete measurement operation. When the herein disclosed digital indicating instrument is operated in an automatic mode, this operation is repeated a great number of times.

Upon completion of each successive measurement operation, the outcome $N_x$ of the measurement of the electromotive force of the Hall device 1 (FIG. 1) can be read from the digital indicator 9 associated with the voltage-code converter 8. This outcome is uninfluenced by the non-equipotentiality voltage $U_p$, since during the two measurement cycles I and II there is stored in the converter 8 information representative of the total output voltage $U_\epsilon$ (FIG. 2c) of the Hall device 1 (FIG. 1), of which the absolute value equals $$|U_\epsilon| = |U_1| + |U_2| = 2 E_{xm}$$

It should be mentioned that the above outcome is the true one only provided that $E_{xm}$ is greater than $U_{pm}$. In accordance with the rule of handling of absolute values, should $E_{xm}$ be smaller than $U_{pm}$, the absolute value of the total voltage would be proportional not to the Hall electromotive force, but to the non-equipotentiality voltage, i.e.

$$|U_\epsilon| = |E_{xm} + U_{pm}| + |E_{xm} - U_{pm}| =$$
$$= E_{xm} + U_{pm} - E_{xm} + U_{pm} = 2 U_{pm}.$$

Consequently, in the case of $E_{xm} < U_{pm}$ the true outcome can be obtained by subtracting the absolute values of the output voltages of the Hall transducer, i.e.

$$|U_\epsilon| = |E_{xm} + U_{pm}| - |E_{xm} - U_{pm}| = 2E_{xm}.$$

In order to detect a situation when the non-equipotentiality voltage of the Hall device rises above the electromotive force thereof, there is incorporated into the herein disclosed apparatus a phase-responsive member 11 (FIG. 1).

The operation of the phase-responsive member 11 is characterized by the following.

If, during both cycles I and II of a measurement operation the reference signal $U_o$ (FIG. 2b) coming from the voltage supply source 7 (FIG. 1) to one of the inputs of the phase-responsive member 11 and the output signals $U_1$ and $U_2$ (FIG. 2c) developed across the respective pairs 4, 5 and 2, 3 of the opposite-polarity electrodes are co-phasal at $E_{xm} > U_{pm}$, then, should the value of $E_{xm}$ be smaller than the value of $U_{pm}$ ($E_{xm} < U_{pm}$), during the first cycle I the signals $u_o$ and $u_1$ (FIG. 2b and c) would be co-phasal, and during the second cycle II the signals $u_o$ and $u_2$ (FIG. 2b and c) would be counter-phasal. This condition is maintained by inverting the output voltage $u_2$ (FIG. 2c) of the Hall device 1 (FIG. 1) during the second cycle II. Information representative of the change in the phase-wise relationship between the voltages $U_o$ and $u_2$, when $E_{xm} < U_{pm}$, is detected by the phase-responsive member 11. The output signal $u_{11}$ (FIG. 2h) of the phase-responsive member 11 (FIG. 1) is utilized to re-condition the voltage-code 8, so that the latter in this case performs subtraction of the respective outcomes $H_1$ and $H_2$ of the first and second cycles I and II (FIG. 2e).

With the structure of the herein disclosed digital indicating instrument of the electromotive force of a Hall-effect device including the phase-responsive member 11, the response of the apparatus, as a whole, is substantially improved, because it becomes possible to measure the electromotive force of the Hall device, which is of a value that is lower than the value of the non-equipotentiality voltage. Moreover, when no magnetic field is present, i.e. when $e_x = 0$, the indicator displays zero reading, because the phase shift between the non-equipotentiality voltage $U_p$ and the reference signal $u_o$ varies from the cycle I to the cycle II through 180° (FIG. 2b and c), and, therefore, the equal outcomes of the coding during the two cycles ($H_1 = H_2$) are subtracted from one another, giving zero as the result ($H_1 - H_2 = 0$).

Thus, when compared with the hitherto known indicating instruments of the electromotive force of a Hall-effect device, the herein disclosed apparatus offers a greater accuracy, better response and swiftness of action; it provides for measuring the true value of the Hall electromotive force, the entire measuring process being performed automatically.

What is claimed is:

1. A digital indicating instrument for indicating the electromotive force of a Hall-effect device having at least two pairs of opposed electrodes, comprising a selector switch electrically connected with said pairs of said electrodes; a voltage supply source connected to said selector switch to be alternatingly connected to one then to the other of said two pairs of said electrodes by means of said selector switch; a voltage-code converter connected to said selector switch to be alternatingly connected to one then to the other of said two pairs of said electrodes, the voltage source and the voltage-code converter being alternately connected to opposite pairs of electrodes by the connections of the selector switch; a numerical indicator having an input connected to the output of said voltage-code converter; circuit means determining the moment of completion of a coding cycle of said voltage-code converter and generating a signal indicative thereof, the input of said circuit means being connected to said voltage-code converter, the output of said circuit means being connected to said selector switch to switch the connections of the opposite pairs of said electrodes and also to said converter to begin a new coding cycle, the indicator, following the second coding cycle, indicating the electromotive force of the Hall-effect device, while eliminating the influence of non-equipotential voltage.

2. A digital indicating instrument as claimed in claim 1, further comprising a phase-responsive member adapted to develop a control signal to be sent to said voltage-code converter, when the voltage of the non-equipotentiality of said Hall-effect device becomes greater than the electromotive force thereof, one input of said phase-responsive member being connected to the output of said selector switch, the other input of said phase-responsive member being connected to said voltage supply source, the output of said phase-responsive member being connected to said voltage-code converter.

* * * * *